United States Patent
Tango et al.

(10) Patent No.: US 10,754,312 B2
(45) Date of Patent: Aug. 25, 2020

(54) CLEANING PROCESS OPTIMIZATION DEVICE AND MACHINE LEARNING DEVICE

(71) Applicant: FANUC CORPORATION, Yamanashi (JP)

(72) Inventors: Chikara Tango, Yamanashi (JP); Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 141 days.

(21) Appl. No.: 15/921,359

(22) Filed: Mar. 14, 2018

(65) Prior Publication Data

US 2018/0267489 A1 Sep. 20, 2018

(30) Foreign Application Priority Data

Mar. 15, 2017 (JP) ................................ 2017-050083

(51) Int. Cl.
*G05B 15/02* (2006.01)
*B08B 3/02* (2006.01)
(Continued)

(52) U.S. Cl.
CPC .............. *G05B 15/02* (2013.01); *B08B 3/024* (2013.01); *B08B 13/00* (2013.01);
(Continued)

(58) Field of Classification Search
CPC ............ G06N 20/00; G06N 3/02; G06N 3/04; G06N 3/08; G05B 15/02; B08B 3/024;
(Continued)

(56) References Cited

U.S. PATENT DOCUMENTS 4,365,383 A 12/1982 Bartlett
2001/0049846 A1 12/2001 Guzzi et al.
(Continued)

FOREIGN PATENT DOCUMENTS

CN 103315683 A 9/2013
CN 105630882 A 6/2016
(Continued)

OTHER PUBLICATIONS

Thrun, Sebastian and Tom M. Mltchell. "Lifelong robot learning" 1995 [Online] Downloaded Oct. 3, 2019 https://www.sciencedirect.com/science/article/pii/092188909500004Y (Year: 1995).*
(Continued)

*Primary Examiner* — Ben M Rifkin
(74) *Attorney, Agent, or Firm* — Hauptman Ham, LLP (57) ABSTRACT

A cleaning process optimization device includes a machine learning device that learns a cleaning condition when cleaning an object to be cleaned. The machine learning device includes: a state observation unit that observes cleaning condition data indicating the cleaning condition, and contamination state data indicating a contamination state of the object to be cleaned measured before cleaning as a state variable representing a current state of environment; a determination data acquisition unit that acquires determination data indicating an adequacy determination result on accuracy of a contamination state of the object to be cleaned after cleaning; and a learning unit that learns the cleaning condition when cleaning the object to be cleaned in association with the contamination state data using the state variable and the determination data.

8 Claims, 8 Drawing Sheets

(51) Int. Cl.
  *G06N 20/00* (2019.01)
  *B08B 13/00* (2006.01)
  *G05B 13/02* (2006.01)
  *G05B 19/406* (2006.01)
  *G06N 3/08* (2006.01)

(52) U.S. Cl.
  CPC ....... *G05B 13/0265* (2013.01); *G05B 19/406* (2013.01); *G06N 3/08* (2013.01); *G06N 20/00* (2019.01)

(58) Field of Classification Search
  CPC .. B08B 13/00; G06B 13/0265; G06B 19/4065
  See application file for complete search history.

(56) References Cited

U.S. PATENT DOCUMENTS

| | | | |
|---|---|---|---|
| 2003/0157242 A1* | 8/2003 | Nakano | C23C 14/564 427/8 |
| 2006/0218680 A1* | 9/2006 | Bailey, III | B08B 1/00 414/217 |
| 2012/0017941 A1 | 1/2012 | Preiss | |
| 2016/0263687 A1 | 9/2016 | Matsunaga et al. | |
| 2017/0031328 A1 | 2/2017 | Sawada et al. | |
| 2017/0032283 A1 | 2/2017 | Kamiya | |

FOREIGN PATENT DOCUMENTS

| | | |
|---|---|---|
| JP | H6-88788 A | 3/1994 |
| JP | H7-59716 A | 3/1995 |
| JP | 2004-503853 A | 2/2004 |
| JP | 2008-156715 A | 7/2008 |
| JP | 2008-287378 A | 11/2008 |
| JP | 2010-22556 A | 2/2010 |
| JP | 2015-217520 A | 12/2015 |
| JP | 2016-168649 A | 9/2016 |
| JP | 2017-30067 A | 2/2017 |
| JP | 2017-33239 A | 2/2017 |
| JP | 2017-33525 A | 2/2017 |

OTHER PUBLICATIONS

Krishnamurthy, Adarsh. Wei Li, and Sara McMains. "Simulation and Optimization of the Water-Jet Cleaning Process" 2010 [Online] Downloaded Apr. 16, 2020 (Year: 2010).*

Notice of Allowance in JP Application No. 2017-050083, dated Feb. 26, 2019, 3pp.

Office Action in JP Application No. 2017-050083, dated Sep. 25, 2018, 16pp.

Office Action in Chinese Application No. 201810213849.5; dated Nov. 4, 2019; 12 pgs.

* cited by examiner

CLEANING PROCESS OPTIMIZATION DEVICE AND MACHINE LEARNING DEVICE

RELATED APPLICATIONS

The present application claims priority to Japanese Patent Application No. 2017-050083 filed on Mar. 15, 2017, the disclosure of which is hereby incorporated by reference herein in its entirety.

BACKGROUND OF THE INVENTION

1. Field of the Invention

The present invention relates to a cleaning process optimization device and a machine learning device.

2. Description of the Related Art

In a machine tool, a machining space is covered with a cover to prevent a chip and a coolant from scattering to the surroundings. A large amount of chips are generated when machining a workpiece by a tool, and the chips accumulate in the space (hereinafter referred to as "interior") covered with the cover. As the chips enter a mechanical part of the machine tool, the mechanical part fails in some cases. Thus, it is necessary to clean the chips accumulated in the machine, and there are a case where such a cleaning work inside the machine is manually performed, a case where the machine is cleaned by using an in-machine cleaning device that feeds a coolant into the machine using a pump and discharges chips together with the coolant outside the machine, and the like (for example, Japanese Patent Application Laid-open No. 2016-168649).

Meanwhile, currently, there are a wide range of workpieces to be machined by machine tools, and types thereof range from high-efficiency machining to high-grade machining. At that time, the chips, coolants, or the like may sometimes adhere to a surface of the workpiece after machining, and a problem, for example, that the chips scratch the surface of the workpiece in a subsequent work process may occur if such contamination is neglected. In order to prevent such a problem, it is necessary to clean the surface of the workpiece as quickly as possible after the end of the machining. Cleaning work of a workpiece is sometimes performed manually or performed using a workpiece cleaning device (for example, Japanese Patent Application Laid-open No. 2008-156715).

A cleaning process of a machine tool and a workpiece is an important factor in the series of machining work using the machine tool. However, the chips generated by machining of the workpiece are scattered over a wide range inside the machine so that scattering positions, the amount, sizes, or the like thereof vary, and contamination is not necessarily uniform. Thus, there is a problem that it is necessary to adjust a cleaning condition (an angle of a cleaning nozzle, pressure of injection or suction, a cleaning time, or the like) in accordance with a state of the contamination. In addition, an adhesion position, an adhesion amount, or the like of the chips, coolants, or the like adhering to the surface of the workpiece vary, and further, there is a case where the surface of the workpiece may be scratched by cleaning during the cleaning of the workpiece. In order to prevent such a case, it is necessary to perform precise cleaning while finely adjusting the cleaning condition (the angle of the cleaning nozzle, the pressure of cleaning or suction, the cleaning time, or the like), which causes a problem that enormous time and effort are required.

SUMMARY OF THE INVENTION

Therefore, an object of the present invention is to provide a cleaning process optimization device and a machine learning device capable of determining an adequate cleaning condition in accordance with states of a machine tool and a workpiece.

One aspect of the present invention is a cleaning process optimization device that optimizes a cleaning condition when performing cleaning of an object to be cleaned, the cleaning process optimization device including: a machine learning device that learns the cleaning condition when cleaning the object to be cleaned. The machine learning device includes: a state observation unit that observes cleaning condition data indicating the cleaning condition when cleaning the object to be cleaned, and contamination state data indicating a contamination state of the object to be cleaned measured before cleaning the object to be cleaned as a state variable representing a current state of environment; a determination data acquisition unit that acquires determination data indicating an adequacy determination result on accuracy of a contamination state of the object to be cleaned after cleaning; and a learning unit that learns the cleaning condition when cleaning the object to be cleaned in association with the contamination state data using the state variable and the determination data.

Another aspect of the present invention is a machine learning device that learns a cleaning condition when performing cleaning of an object to be cleaned, the machine learning device including: a state observation unit that observes cleaning condition data indicating the cleaning condition when cleaning the object to be cleaned, and contamination state data indicating a contamination state of the object to be cleaned measured before cleaning the object to be cleaned as a state variable representing a current state of environment; a determination data acquisition unit that acquires determination data indicating an adequacy determination result on accuracy of a contamination state of the object to be cleaned after cleaning; and a learning unit that learns the cleaning condition when cleaning the object to be cleaned in association with the contamination state data using the state variable and the determination data.

According to the present invention, it is possible to efficiently perform cleaning on various machine tools and workpieces since it is possible to optimize a cleaning process in accordance with an in-machine state of a machine tool and a surface condition of a workpiece by combining a known technique of performing cleaning of the machine tools and the workpieces and machine learning.

BRIEF DESCRIPTION OF THE DRAWINGS

The above-described and other objects and characteristics of the present invention are made apparent in the following description of an embodiment with reference to the appended drawings. Among these drawings.

DETAILED DESCRIPTION OF THE PREFERRED EMBODIMENTS

Hereinafter, embodiments of the present invention will be described with reference to the drawings.

Figure 1:
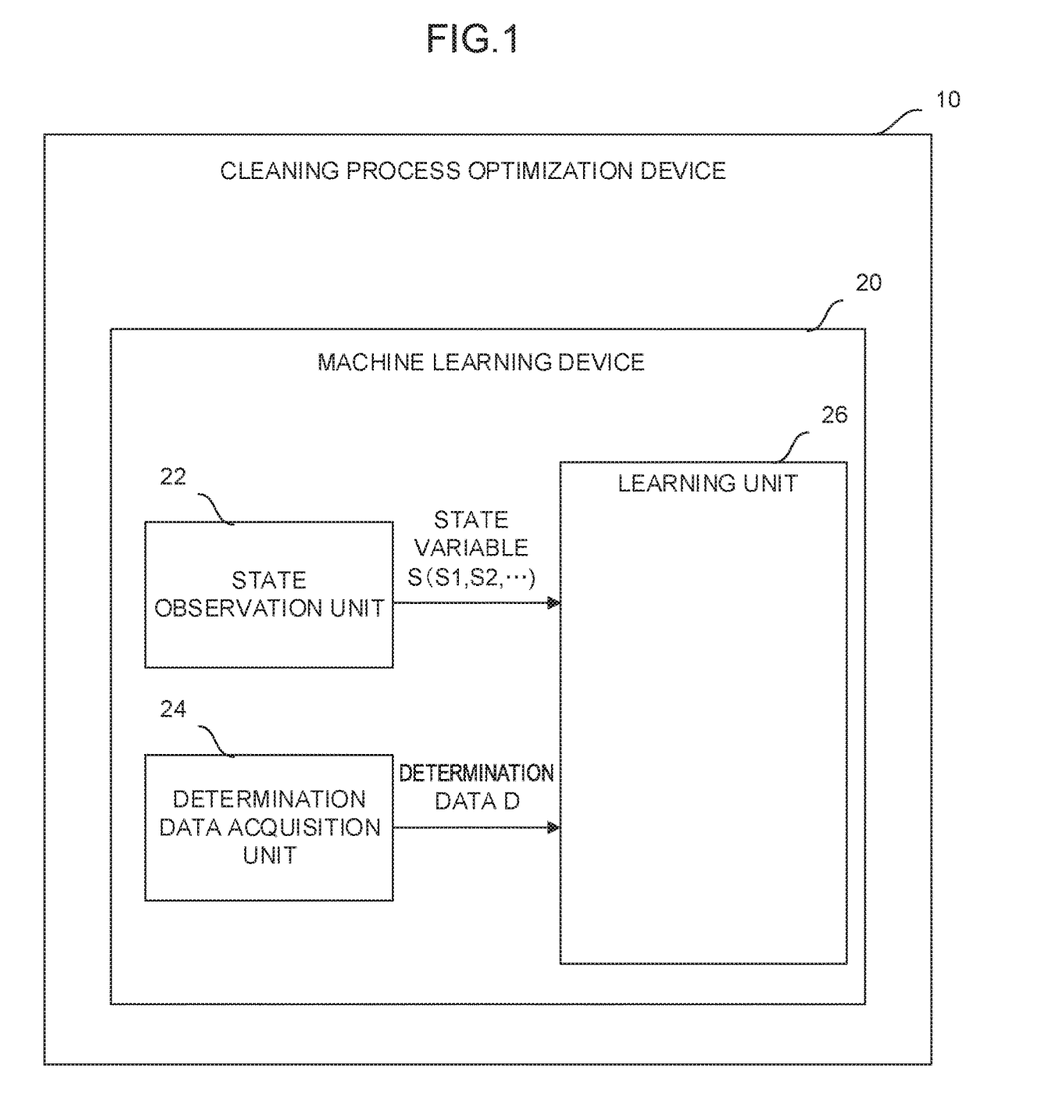
FIG. 1 is a schematic functional block diagram of a cleaning process optimization device according to a first embodiment.

FIG. 1 is a schematic functional block diagram of a cleaning process optimization device 10 according to a first embodiment. The cleaning process optimization device 10 can be implemented, for example, as a control device that controls an industrial machine (not illustrated) used to clean a machine tool or a workpiece. Examples of the industrial machine used to clean the machine tool or the workpiece include a cleaning device including a cleaning nozzle to spray a cleaning solution using a pump, a robot holding the cleaning nozzle, and the like. The cleaning process optimization device 10 includes a machine learning device 20 having software (learning algorithm or the like), configured for self-learning of a cleaning condition (an angle of a cleaning nozzle, pressure of cleaning or suction, a cleaning time, or the like) in a cleaning process of a machine tool or a workpiece by so-called machine learning, and hardware (a CPU of a computer or the like). The cleaning condition learned by the machine learning device 20 included in the cleaning process optimization device 10 corresponds to a model structure representing a correlation between a contamination state (such as the amount of chips or coolants, or the like) of the machine tool or the workpieces as an object to be cleaned and a cleaning condition during the cleaning of the object to be cleaned.

As illustrated in the functional block in FIG. 1, the machine learning device 20 included in the cleaning process optimization device 10 includes: a state observation unit 22 that observes cleaning condition data S1 indicating a cleaning condition to be applied to the object to be cleaned (not illustrated) such as the machine tool and the workpiece, and contamination state data S2 indicating a contamination state of the object to be cleaned such as the machine tool and the workpiece, as a state variable S representing a current state of environment; a determination data acquisition unit 24 that acquires determination data D indicating an adequacy determination result on the contamination state of the object to be cleaned after being subjected to cleaning; and a learning unit 26 that learns the cleaning condition data S1 in association with the contamination state data S2 using the state variable S and the determination data D.

The state observation unit 22 can be configured as one function of, for example, the CPU of the computer. Alternatively, the state observation unit 22 can be configured as, for example, software to cause the CPU of the computer to function. For example, it is possible to use declaration data of a cleaning condition, which has been declared by a skilled worker and given to the cleaning process optimization device 10, or to use an operation parameter at the time of cleaning acquired from an industrial machine when using the industrial machine used for cleaning as the cleaning condition data S1 in the state variable S observed by the state observation unit 22. For example, it is possible to use a distance of the cleaning nozzle from a contamination center position during cleaning, the angle of the cleaning nozzle, the pressure of cleaning or suctioning, the cleaning time, temperature of the cleaning solution, the number of times of cleaning, or the like as the cleaning condition data S1.

In addition, it is possible to acquire the contamination state data S2 in the state variable S, for example, by actual measurement using a first measurement device (not illustrated) attached to an industrial machine used for cleaning controlled by the cleaning process optimization device.

For example, when the object to be cleaned is the machine tool, the first measurement device can measure the entire machine tool or at least one point of interest in the machine tool from a predetermined position. For example, when the object to be cleaned is the workpiece, the first measurement device can measure the entire workpiece or at least one point of interest thereof from a predetermined position. The first measurement device can calculate the contamination state data S2 of each part of the object to be cleaned based on a difference from a measured value of the entire object to be cleaned or at least one point of interest thereof which has been acquired by measuring the object to be cleaned before being contaminated in advance. The first measurement device can cause the contamination state data S2 to include the amount (the area, volume, or the like) of the difference, a color of the difference, or the like based on the difference from the measured value of the entire object to be cleaned or at least one point of interest thereof which has been acquired by measuring the object to be cleaned before being contaminated in advance. This calculation can be performed by, for example, the cleaning process optimization device 10 or by the state observation unit 22 itself. It is possible to adopt an optical imaging device, an infrared laser, an ultrasonic measurement device, or the like as the first measurement device.

The determination data acquisition unit 24 can be configured as one function of, for example, the CPU of the computer. Alternatively, the determination data acquisition unit 24 can be configured as, for example, software to cause the CPU of the computer to function. The determination data D acquired by the determination data acquisition unit 24 can be acquired by actually measuring the object to be cleaned after being subjected to cleaning, for example, by using the first measurement device attached to the cleaning machine. The determination data D is an index representing a result obtained when executing cleaning work under the state variable S and indirectly represents the current state of the environment in which the cleaning work has been performed.

In this manner, measurement of a contamination state of the object to be cleaned using the first measurement device, implementation of cleaning work on the object to be cleaned, and re-measurement of a contamination state of the object to be cleaned after cleaning using the first measurement device are implemented under the environment while the machine learning device 20 of the cleaning process optimization device 10 proceeds learning.

The learning unit 26 can be configured as one function of, for example, the CPU of the computer. Alternatively, the learning unit 26 can be configured as, for example, software to cause the CPU of the computer to function. The learning unit 26 learns the cleaning condition of the cleaning to be performed on the object to be cleaned according to an arbitrary learning algorithm collectively called machine learning. The learning unit 26 can repeatedly execute learning based on data set including the above-described state variable S and determination data D for a plurality of objects to be cleaned. During the repetition of a learning cycle for the plurality of objects to be cleaned, the cleaning condition data S1 in the state variable S is a cleaning condition obtained in the learning cycle up to the previous time, and the determination data D is an adequacy determination result with respect to cleaning of the object to be cleaned based on the determined cleaning condition.

By repeating such a learning cycle, the learning unit 26 can automatically identify a feature that implies the correlation between the contamination state of the object to be cleaned (the contamination state data S2) and the cleaning condition of cleaning on the object to be cleaned. Although the correlation between the contamination state data S2 and the cleaning condition is substantially unknown at the start of the learning algorithm, the learning unit 26 gradually identifies the feature and interprets the correlation as the learning proceeds. When the correlation between the contamination state data S2 and the cleaning condition is interpreted to a level that is reliable to some extent, a learning result repeatedly output by the learning unit 26 can be used to perform selection (that is, decision making) on action such as any cleaning condition under which cleaning needs to be performed for the object to be cleaned in the current state (that is, contamination state). That is, as the learning algorithm proceeds, the learning unit 26 can gradually approach to an optimum solution of a correlation between a current state of an object to be cleaned and the action of any cleaning condition under which cleaning needs to be performed for the object to be cleaned in the current state.

As described above, the learning unit 26 learns the cleaning condition when cleaning the object to be cleaned according to the machine learning algorithm using the state variable S observed by the state observation unit 22 and the determination data D acquired by the determination data acquisition unit 24 in the machine learning device 20 included in the cleaning process optimization device 10. The state variable S is constituted by data that is not easily affected by disturbance, such as the cleaning condition data S1 and the contamination state data S2, and the determination data D is uniquely determined by measuring the object to be cleaned after cleaning. Although the contamination state data S2 depends on, for example, the measurement accuracy of each part of the machine as the capability of the first measurement device, it is expected that the contamination state data S2 can be observed with high accuracy based on such a dependence itself. This applies similarly to the determination data D, and it is expected that the determination data D can be acquired with high accuracy depending on the measurement accuracy of the first measurement device. Therefore, it is possible to automatically and accurately obtain the cleaning condition when cleaning the object to be cleaned in accordance with the contamination state of the object to be cleaned without calculation or rough estimation by using the learning result of the learning unit 26 according to the machine learning device 20 included in the cleaning process optimization device 10.

If it is possible to automatically obtain the cleaning condition when cleaning the object to be cleaned without calculation or rough estimation, it is possible to promptly determine the cleaning condition when cleaning the object to be cleaned by simply measuring the object to be cleaned before starting the cleaning of the object to be cleaned and acquiring the contamination state (the contamination state data S2). Therefore, it is possible to shorten the time required for the cleaning work of the object to be cleaned.

As a modified example of the machine learning device 20 included in the cleaning process optimization device 10, the state observation unit 22 can further observe type information S3 to identify a type of object to be cleaned as the state variable S. For example, the type information S3 can include a type, a model number, or the like of a machine tool when the object to be cleaned is the machine tool, and a product type, a material, or the like of a workpiece when the object to be cleaned is the workpiece. For example, the type information S3 can be displayed on the object to be cleaned using an identifier such as a bar code. For example, the state observation unit 22 can acquire the type information S3 from an output of a bar code reader. The learning unit 26 can learn the cleaning condition for the cleaning of the object to be cleaned in association with both the contamination state data S2 and the type information S3.

According to the above-described modified example, it is possible to learn an optimum cleaning condition of a normal object in accordance with both the contamination state of an object to be manufactured and a type of the normal object. For example, regarding two workpieces to be cleaned, there may occur a situation where cleaning conditions for cleaning the workpieces are slightly different from each other when contamination states (the contamination state data S2) of the workpieces are substantially the same but materials or the like (the type information S3) of the workpieces are different. According to the above-described configuration, even under such a situation, it is possible to optimize the cleaning condition when cleaning the object to be cleaned in accordance with the material or the like (the type information S3). Alternatively, there is also a case where it is possible to find the correlation between the contamination state (the contamination state data S2) of the object to be cleaned and the type (the type information S3) of the object to be cleaned while continuing the learning. In this case, it is possible to predict the contamination state data S2 to some extent based on the type information S3, and thus, it is possible to optimize the cleaning condition when cleaning the object to be cleaned by properly converging the learning even when the measurement accuracy of each part of the machine using the first measurement device is low.

As another modified example of the machine learning device 20 of the cleaning process optimization device 10, the learning unit 26 can learn the cleaning condition when cleaning the object to be cleaned in each of a plurality of industrial machines used for the cleaning using the state variable S and the determination data D obtained for each of the industrial machines used for cleaning having the same configuration. According to this configuration, it is possible to increase the amount of data sets including the state variable S and the determination data D that can be obtained for a certain period of time, and thus, it is possible to improve the speed and reliability of learning on the cleaning condition when cleaning the object to be cleaned by using more diverse data sets as inputs.

Figure 2:
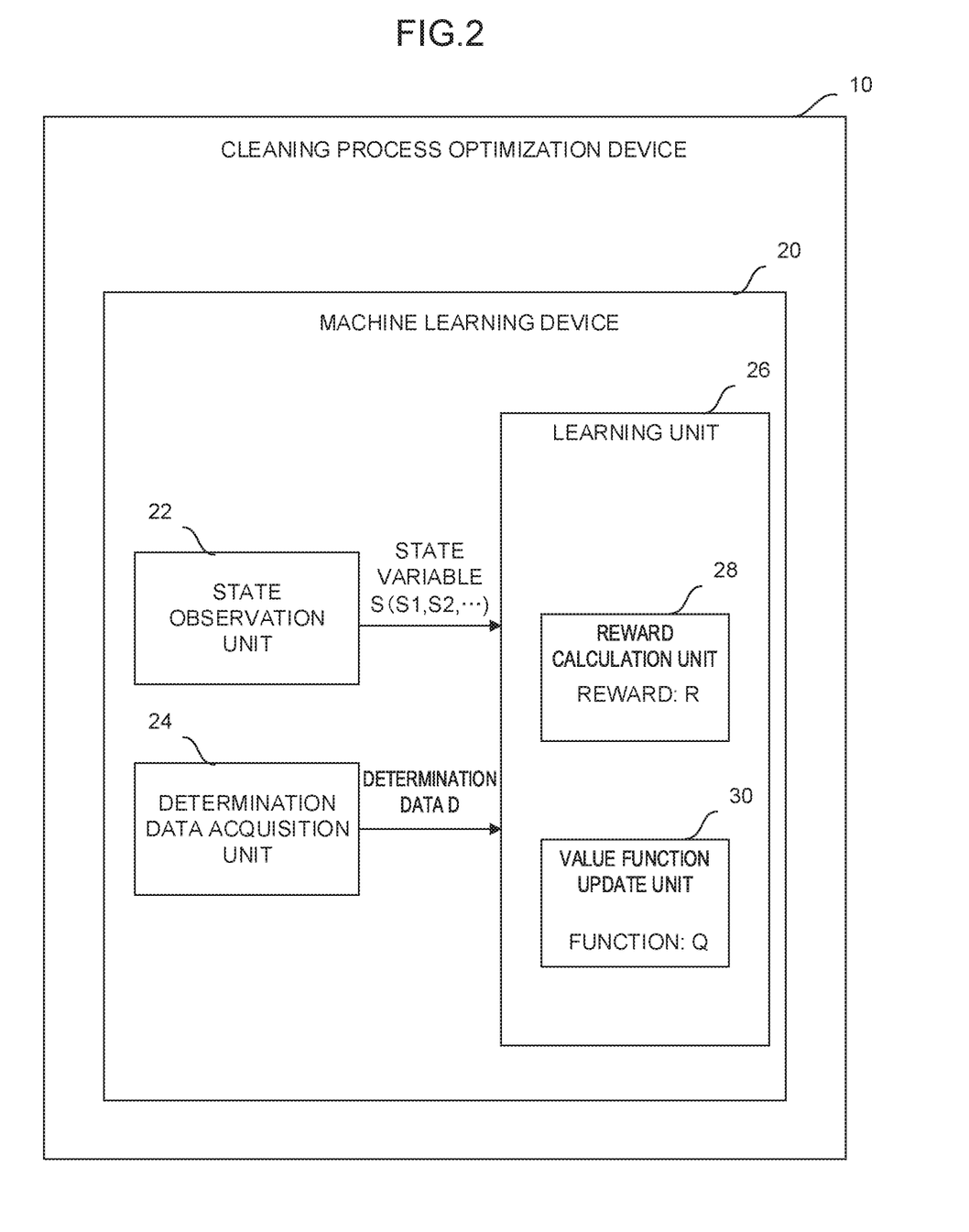
FIG. 2 is a schematic functional block diagram illustrating one aspect of the cleaning process optimization device.

In the machine learning device 20 having the above-described configuration, the learning algorithm to be executed by the learning unit 26 is not particularly limited, and a learning algorithm known as machine learning can be adopted. FIG. 2 illustrates a configuration in which the learning unit 26 that executes reinforcement learning as an example of the learning algorithm is included as an aspect of the cleaning process optimization device 10 illustrated in FIG. 1. The reinforcement learning is a technique of learning a plan (the cleaning condition when cleaning the object to be cleaned in the machine learning device of the present application) that maximizes the sum of rewards as an optimum solution, as an optimum solution, by repeating a cycle in which predetermined action (that is, output) is executed under a current state while observing the current state (that is, input) of environment under which an object to be learned is present and some rewards are given to such action, in a trial-and-error manner.

In the machine learning device 20 included in the cleaning process optimization device 10 illustrated in FIG. 2, the learning unit 26 includes: a reward calculation unit 28 that obtains a reward R relating to an adequacy determination result (corresponding to the determination data D to be used in the next learning cycle) on the contamination state of the object to be cleaned after cleaning obtained by cleaning the object to be cleaned based on the state variable S; and a value function update unit 30 that updates a function Q representing a value of the cleaning condition to be adopted at the time of cleaning of the object to be cleaned using the reward R. The learning unit 26 learns the cleaning condition when cleaning the object to be cleaned as the value function update unit 30 repeats updating of the function Q.

An exemplary algorithm of the reinforcement learning executed by the learning unit 26 will be described. The algorithm according to this example is known as Q-learning, and is a technique of learning a function Q(s, a) representing a value of action when action a is selected in a state s using the state s of an acting subject and the action a selectable by the acting subject in the state s as independent variables. The optimum solution is to select the action a with the highest value function Q in the state s. The Q-learning is started in a state where a correlation between the state s and the action a is unknown, and the value function Q is repeatedly updated to approximate the optimum solution by repeating trial and error in selection of various types of action a in an arbitrary state s. Here, when the environment (that is, the state s) has changed as a result of selecting the action a in the state s, it is possible to cause the value function Q to approximate to the optimum solution in a relatively short time by configuring the reward (that is, a weight of the action a) r corresponding to such a change of environment to be obtainable and guiding learning so as to select action a with which a higher reward r can be obtained.

An update formula of the value function Q can be generally expressed by the following Formula 1. In Formula 1, $s_t$ and $a_t$ are a state and action at time t, respectively, and the state changes to $s_{t+1}$ by action $a_t$. Further, $r_{t+1}$ is a reward obtained as the state changes from $s_t$ to $s_{t+1}$. The term "maxQ" means Q at the time of taking the action "a" (that is considered, at time t,) to reach a maximum value Q at time t+1 (and considered at time t). Further, α and γ are a learning coefficient and a discount rate, respectively, and are arbitrarily set such that 0<α≤1, and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right)$$ [Formula 1]

When the learning unit 26 executes Q-learning, the state variable S observed by the state observation unit 22 and the determination data D acquired by the determination data acquisition unit 24 correspond to the state s of the update formula, action such as how to change the cleaning condition when cleaning an object to be cleaned for the object to be cleaned in the current state (that is, the contamination state) corresponds to the action a of the update formula, and the reward R obtained by the reward calculation unit 28 corresponds to the reward r of the update formula. Accordingly, the value function update unit 30 repeatedly updates the function Q representing the value of the cleaning condition when cleaning the object to be cleaned in the current state by Q-learning using the reward R.

The reward R to be obtained by the reward calculation unit 28 can be set, for example, such that a positive reward R is obtained in a case where a contamination state of an object to be cleaned after cleaning is determined to be "adequate" (that is, if a contamination degree of the object to be cleaned after cleaning falls within an allowable range) at the time of implementing cleaning of the object to be cleaned based on a cleaning condition after determining the cleaning condition when cleaning the object to be cleaned, and a negative reward R is obtained in a case where the contamination state of the object to be cleaned after cleaning is determined to be "inadequate" (that is, if the contamination degree of the object to be cleaned after cleaning is out of the allowable range) at the time of implementing cleaning of the object to be cleaned based on the cleaning condition after determining the cleaning condition when cleaning the object to be cleaned. Absolute values of the positive and negative rewards R may be the same as or different from each other. Here, whether the contamination degree is allowable or not may be determined based on, for example, whether the amount (such as the area and volume) of contamination of the object to be cleaned, which has been measured by the first measurement device, is equal to or less than a predetermined threshold value.

At this time, it is determined whether the contamination state falls within the allowable range for each part of the object to be cleaned after cleaning. It may be determined to be "adequate" in a case where the contamination state falls within the allowable range for all the parts, or may be determined to be "adequate" in a case where the sum of the contamination states of the respective parts of the object to be cleaned after cleaning falls within the allowable range. In addition, the determination may be made by combining both the cases.

In addition, it is possible to set the adequacy determination result of the contamination state of the object to be cleaned after cleaning to not only two kinds of "adequate" and "inadequate" but also to a plurality of stages in accordance with the contamination degree. For example, when a maximum value of the allowable range is Tmax, it can be configured to give the reward R=5 is given when a contamination amount K remaining in the object to be cleaned after cleaning is given as 0≤K<Tmax/5, to give the reward R=2 when Tmax/5≤K<Tmax/2, and to give the reward R=1 when Tmax/2≤K≤Tmax. Further, it is also possible to set Tmax to be relatively large in an initial stage of learning and to reduce Tmax as the learning proceeds.

Further, the reward R may be configured such that a positive reward is given as the cleaning time becomes shorter than a predetermined threshold value set in advance. In this manner, cleaning is performed preferentially in a cleaning condition with a shorter cleaning time among the cleaning conditions in which the contamination state of the object to be cleaned is determined to be "adequate", and thus, it is possible to shorten a cycle time of the cleaning process.

The value function update unit 30 can have an action-value table in which the state variable S, the determination data D, and the reward R are organized in association with the action value (for example, a numerical value) represented by the function Q. In this case, the act of the value function update unit 30 updating the function Q is synonymous with the act of the value function update unit 30 updating the action-value table. Since the correlation between the current state of the environment and the cleaning condition when cleaning the object to be cleaned is unknown at the start of Q-learning, various types of the state variable S, the determination data D, and the reward R are prepared in the form of being associated with a randomly determined value (function Q) of the action value in the action-value table. Incidentally, the reward calculation unit 28 can immediately calculate the reward R corresponding to the determination data D if the determination data D is known, and the calculated value R is written in the action-value table.

When the Q-learning is continued using the reward R in accordance with the adequacy determination result on the contamination state of the object to be cleaned after cleaning, the learning is guided in a direction of selecting action with which a higher reward R can be obtained. The value (function Q) of the action value for action to be performed in a current state is rewritten in accordance with the state (that is, the state variable S and the determination data D) of environment changing as a result of executing the selected action in the current state, whereby the action-value table is updated. With repetition of this update, the value (function Q) of the action value displayed in the action-value table is rewritten so as to have a larger value for more adequate action. In this manner, the correlation between the current state of the environment (the contamination state of the object to be cleaned), which has been unknown, and the action (the cleaning condition when cleaning the object to be cleaned) for this current state becomes gradually apparent. That is, a relation between the contamination state before cleaning of the object to be cleaned and the cleaning condition when cleaning the object to be cleaned gradually approximates to the optimum solution by updating the action-value table.

Figure 3:
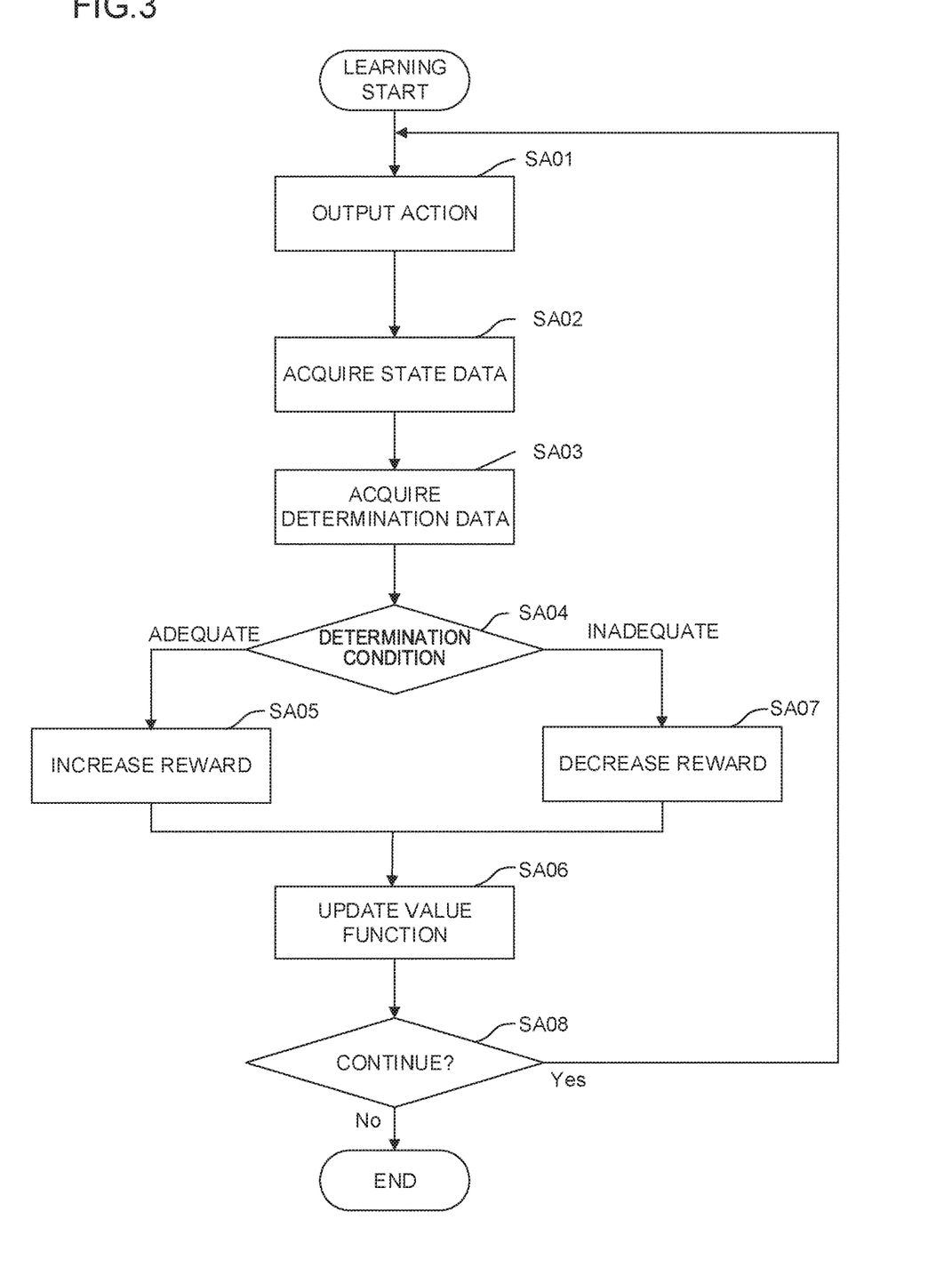
FIG. 3 is a schematic flow chart illustrating one aspect of a machine learning method.

With reference to FIG. 3, the flow of the above-described Q-learning (that is, one aspect of a machine learning method) executed by the learning unit 26 will be further described. In Step SA01, the value function update unit 30 first randomly selects a cleaning condition when cleaning the object to be cleaned as action to be performed in a current state, indicated by the state variable S observed by the state observation unit 22, with reference to the action-value table at that time. After executing cleaning, the value function update unit 30 next obtains the state variable S of the current state being observed by the state observation unit 22 in Step SA02, and obtains the determination data D of the current state being acquired by the determination data acquisition unit 24 in Step SA03. Next, the value function update unit 30 determines whether the cleaning condition when cleaning the object to be cleaned is adequate based on the determination data D in Step SA04, applies the positive reward R obtained by the reward calculation unit 28 to the update formula of the function Q in Step SA05 if adequate, and then, updates the action-value table using the state variable S, the determination data D, the reward R, and a value of the action value (updated function Q) in the current state in Step SA06. When it is determined in Step SA04 that the cleaning condition when cleaning the object to be cleaned is not adequate, the negative reward R obtained by the reward calculation unit 28 is applied to the update formula of the function Q in Step SA07, and then, the action-value table is updated using the state variable S, the determination data D, the reward R, and a value of the action value (updated function Q) in the current state in Step SA06. The learning unit 26 repeatedly updates the action-value table by repeating the Steps SA01 to SA07, and continues the learning of the cleaning condition when cleaning the object to be cleaned.

Figure 4:
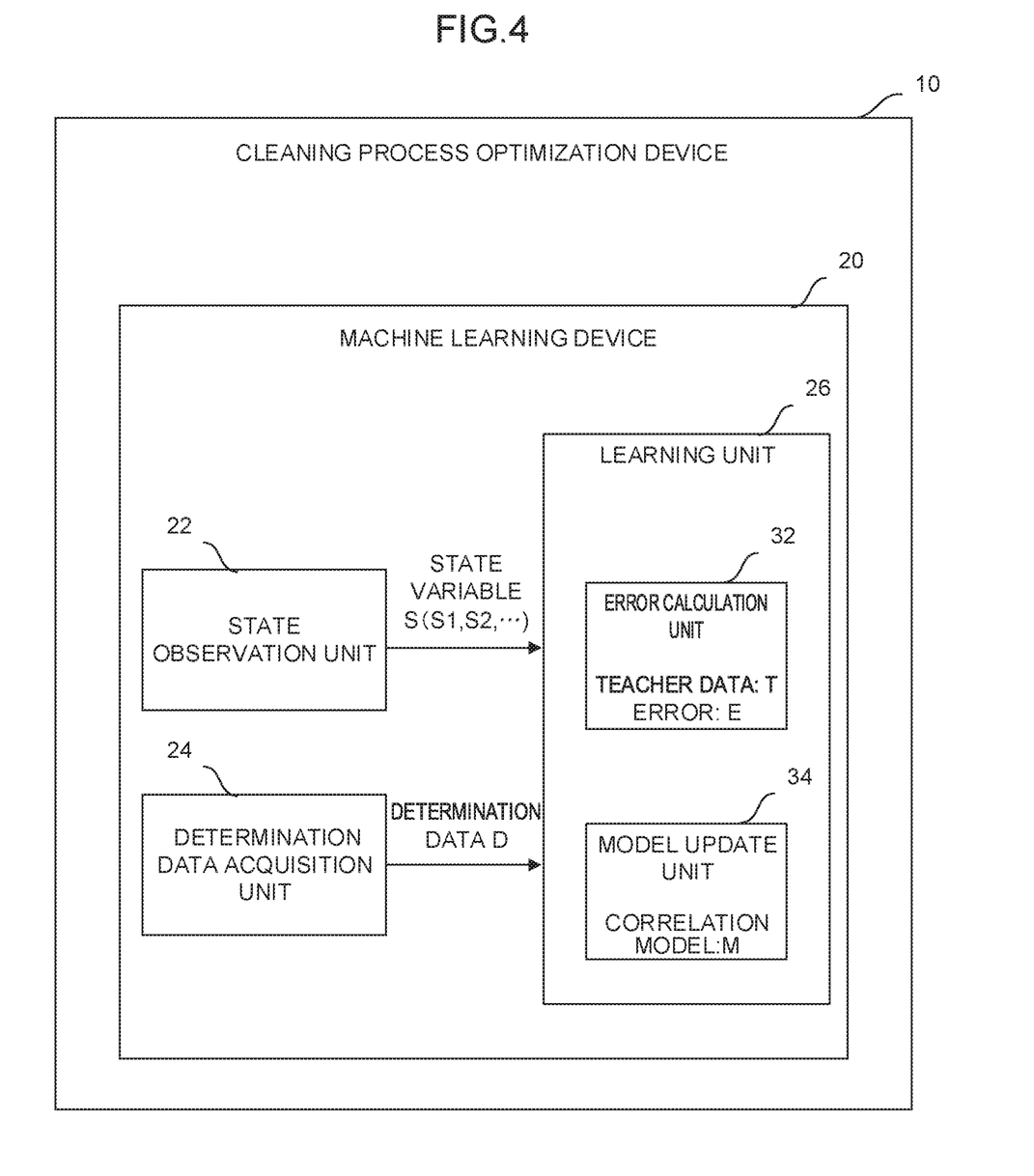
FIG. 4 is a schematic functional block diagram illustrating another aspect of the cleaning process optimization device.

FIG. 4 illustrates a configuration in which the learning unit 26 that executes supervised learning as another example of the learning algorithm is included as another aspect of the cleaning process optimization device 10 illustrated in FIG. 1. The supervised learning is a technique of learning a correlation model (the cleaning condition when cleaning the object to be cleaned in the machine learning device 20 of the present application) to estimate a required output for a new input with a large amount of preliminarily-given known data sets (referred to as teacher data) of an input and an output corresponding thereto by identifying a feature that imply a correlation between the input and output from the teacher data, which is different from the reinforcement learning described above in which the learning is started in the state where the relation between the input and output is unknown.

In the machine learning device 20 included in the cleaning process optimization device 10 illustrated in FIG. 4, the learning unit 26 includes: an error calculation unit 32 that calculates an error E between a correlation model M to derive the cleaning condition when cleaning the object to be cleaned from the state variable S and the determination data D, and a correlation feature identified from teacher data T prepared in advance; and a model update unit 34 that updates the correlation model M so as to reduce the error E. The learning unit 26 learns the cleaning condition when cleaning the object to be cleaned as the model update unit 34 repeats updating of the correlation model M.

An initial value of the correlation model M is set, for example, by simply expressing the correlation between the state variable S and the determination data D, and the cleaning condition when cleaning the object to be cleaned (for example, in a linear function), and is given to the learning unit 26 prior to the start of the supervised learning. The teacher data T is configured using, for example, experience values (known data sets of the contamination states of the object to be cleaned and the cleaning conditions when cleaning the object to be cleaned) accumulated by recording cleaning conditions decided by a skilled worker in the past cleaning of the object to be cleaned, and is given to the learning unit 26 prior to the start of the supervised learning. The error calculation unit 32 identifies the correlation feature, which implies the correlation between the contamination degree of the object to be cleaned and the cleaning condition when cleaning the object to be cleaned, from the large amount of teacher data T given to the learning unit 26, and obtains the error E between the correlation feature and the correlation model M corresponding to the state variable S and the determination data D in the current state. The model update unit 34 updates the correlation model M in a direction of reducing the error E according to, for example, a predetermined update rule.

In the next learning cycle, the error calculation unit 32 uses the state variable S and the determination data D, which have changed by trialing a mounting process according to the updated correlation model M to obtain an error E relating to the correlation model M corresponding to these changed state variable S and determination data D, and the model update unit 34 updates the correlation model M again. In this manner, the correlation between the current state of the environment (the contamination state of the object to be cleaned), which has been unknown, and the action (determination on the cleaning condition when cleaning the object to be cleaned) for this current state becomes gradually apparent. That is, the relation between the contamination state of the object to be cleaned before cleaning and the cleaning condition when cleaning the object to be cleaned gradually approximates to the optimum solution by updating the correlation model M.

Incidentally, it is also possible to configure the machine learning device 20 included in the cleaning process optimization device 10 such that the learning unit 26 executes supervised learning in an initial stage of learning and the learning unit 26 executes reinforcement learning with a cleaning condition when cleaning the object to be cleaned obtained by the supervised learning as an initial value in a stage where the learning has proceeded to some extent. Since the initial value in the reinforcement learning has a certain level of reliability, it is possible to relatively promptly reach the optimum solution.

Figure 5A:
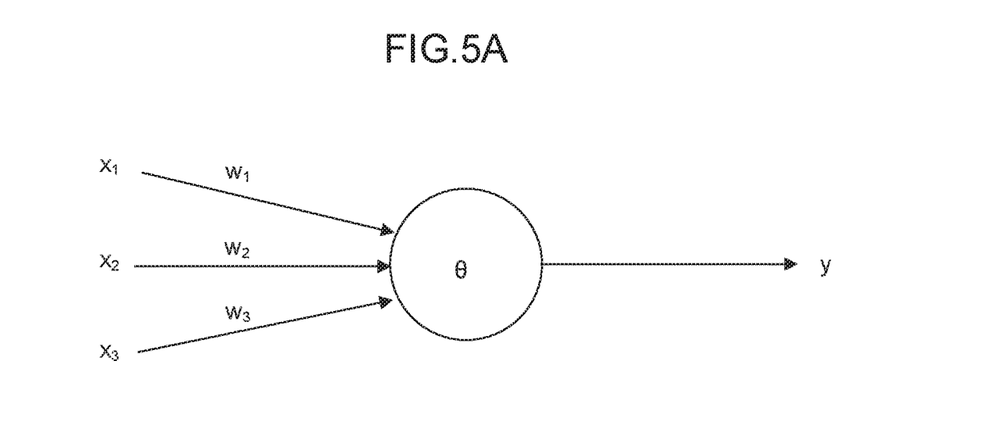
FIG. 5A is a view for describing a neuron.
Figure 5B:
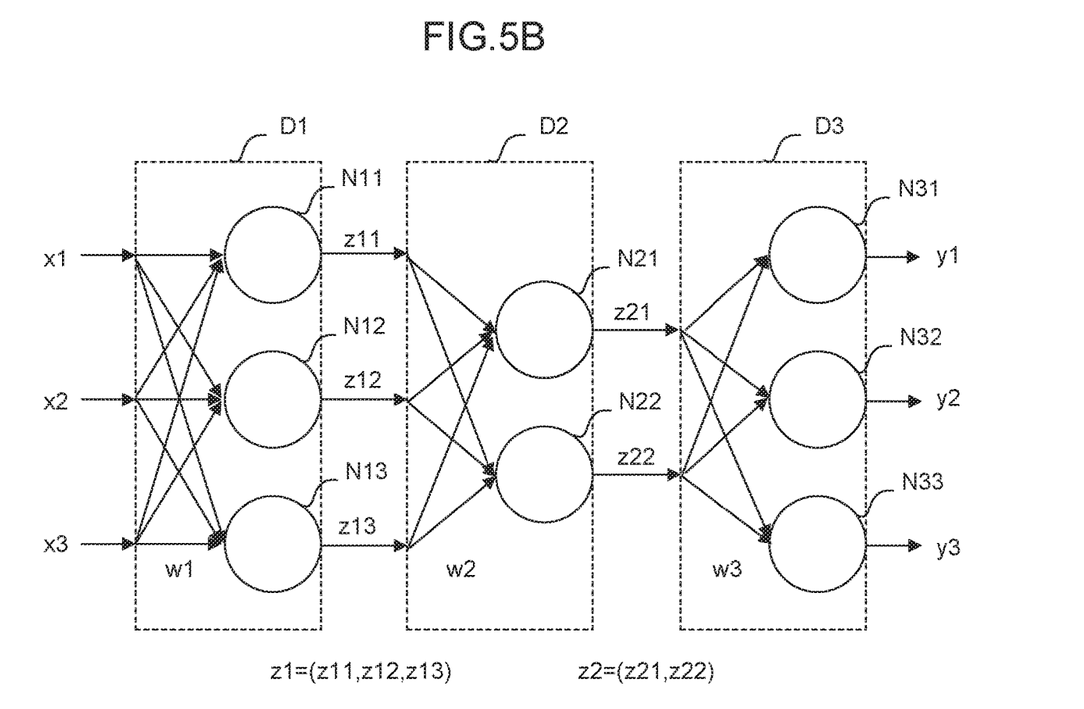
FIG. 5B is a view for describing a neural network.

For example, it is possible to use a neural network instead of the Q-learning at the time of conducting the above-described reinforcement learning or supervised learning. FIG. 5A schematically illustrates a model of a neuron. FIG. 5B schematically illustrates a model of a three-layer neural network constituted by combining the neurons illustrated in FIG. 5A. The neural network can be constituted by, for example, a calculation device, a storage device, and the like imitating the models of neurons.

The neuron illustrated in FIG. 5A outputs a result y for a plurality of inputs x (herein, inputs $x_1$ to $x_3$ as an example). Each of the inputs $x_1$ to $x_3$ is multiplied by a weight w ($w_1$ to $w_3$) corresponding to this input x. As a result, the neuron outputs the output y expressed by the following Formula 2. In Formula 2, the input x, the output y, and the weight w are all vectors. In addition, θ is a bias, and $f_k$ is an activation function.

$$y = f_k(\Sigma_{i=1}^n x_i w_i - \theta) \qquad [\text{Formula 2}]$$

In the three-layer neural network illustrated in FIG. 5B, the plurality of inputs x (herein, inputs x1 to x3 as an example) are input from the left side, and results y (herein, results y1 to y3 as an example) are output from the right side. In the illustrated example, each of the inputs x1, x2, and x3 is multiplied by a corresponding weight (collectively denoted by w1), and all the individual inputs x1, x2, and x3 are input to three neurons N11, N12, and N13.

In FIG. 5B, outputs of the respective neurons N11 to N13 are collectively denoted by z1. Here, z1 can be regarded as a feature vector obtained by extracting a feature amount of an input vector. In the illustrated example, each of the feature vectors z1 is multiplied by a corresponding weight (collectively denoted by W2), and all the individual feature vectors z1 are input to two neurons N21 and N22. The feature vector z1 represents a feature between the weight W1 and the weight W2.

In FIG. 5B, outputs of the respective neurons N21 to N22 are collectively denoted by z2. Here, z2 can be regarded as a feature vector obtained by extracting a feature amount of the feature vector z1. In the illustrated example, each of the feature vectors z2 is multiplied by a corresponding weight (collectively denoted by W3), and all the individual feature vectors z2 are input to three neurons N31, N32, and N33. The feature vector z2 represents a feature between the weight W2 and the weight W3. Finally, the neurons N31 to N33 output the results y1 to y3, respectively.

In the machine learning device 20 of the cleaning process optimization device 10, the learning unit 26 performs the calculation of the multilayer structure according to the above-described neural network with the state variable S and the determination data D as inputs x so that it is possible to output the cleaning condition (result y) for cleaning the object to be cleaned. Incidentally, an operation mode of the neural network includes a learning mode and a value prediction mode. For example, it is possible to learn a weight W using a learning data set in the learning mode and to determine a value of action in the value prediction mode using the learned weight W. Incidentally, it is also possible to perform detection, classification, inference, or the like in the value prediction mode.

The above-described configuration of the cleaning process optimization device 10 can be described as a machine learning method (or software) to be executed by a CPU of a computer. This machine learning method is a machine learning method of learning a cleaning condition when cleaning an object to be cleaned, the method that causes a CPU of a computer to execute: a step of observing the cleaning condition data S1 indicating the cleaning condition when cleaning the object to be cleaned, and the contamination state data S2 indicating a contamination state of the object to be cleaned as the state variable S representing a current state of environment under which cleaning of the object to be cleaned is performed; a step of acquiring the determination data D indicating the adequacy determination result on the contamination state of the object to be cleaned after cleaning; and a step of learning the cleaning condition when cleaning the object to be cleaned in association with the contamination state data S2 using the state variable S and the determination data D.

Figure 6:
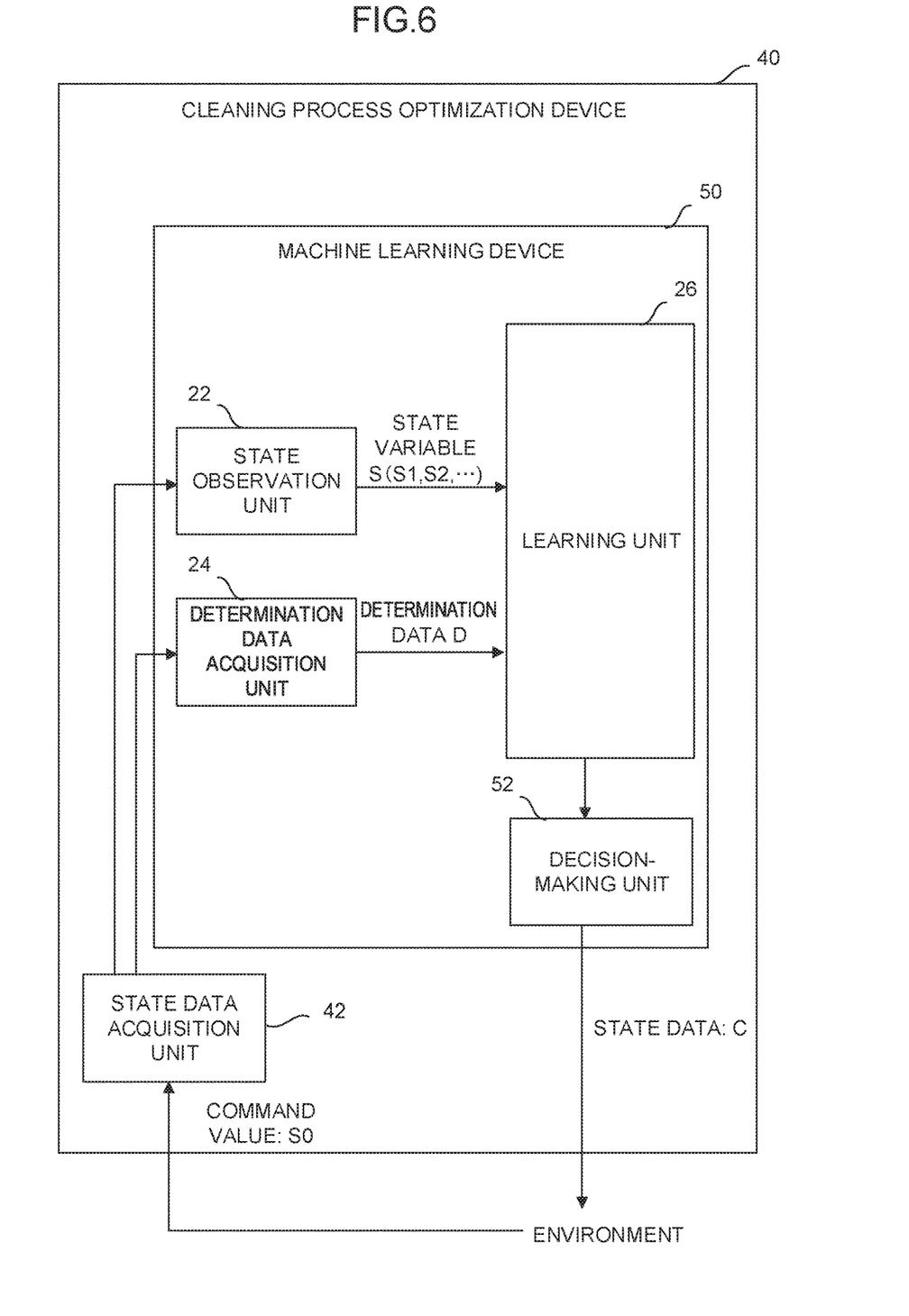
FIG. 6 is a schematic functional block diagram of a cleaning process optimization device according to a second embodiment.

FIG. 6 illustrates a cleaning process optimization device 40 according to a second embodiment. The cleaning process optimization device 40 includes a machine learning device 50 and a state data acquisition unit 42 that acquires the cleaning condition data S1 and the contamination state data S2 of the state variable S, observed by the state observation unit 22, as state data S0. The state data S0 acquired by the state data acquisition unit 42 can also include type information S3. The state data acquisition unit 42 can acquire the state data S0 from the above-described first measurement device attached to the machine or from an appropriate data input by a worker.

The machine learning device 50 included in the cleaning process optimization device 40 includes software (a calculation algorithm or the like) and hardware (a CPU of a computer or the like), configured to display a learned cleaning condition when cleaning an object to be cleaned or output the learned cleaning condition as a command to an industrial machine (not illustrated) to clean the object to be cleaned, as well as software (a learning algorithm or the like) and hardware (a CPU of a computer or the like) configured for self-learning of the cleaning condition when cleaning the object to be cleaned by machine learning. The machine learning device 50 included in the cleaning process optimization device 40 can also have a configuration in which one common CPU executes the entire software such as the learning algorithm and the calculation algorithm.

A decision-making unit 52 can be configured as one function of, for example, the CPU of the computer. Alternatively, the decision-making unit 52 can be configured as, for example, software to cause the CPU of the computer to function. The decision-making unit 52 displays the cleaning condition when cleaning the object to be cleaned learned by the learning unit 26 to the worker, or generates a command value C with respect to an industrial machine, which performs cleaning based on the cleaning condition when cleaning the object to be cleaned learned by the learning unit 26, and outputs the generated command value C. When the decision-making unit 52 displays the cleaning condition when cleaning the object to be cleaned and the cleaning of the object to be cleaned is performed by the worker based on the displayed cleaning condition, and when the decision-making unit 52 outputs the command value C to the industrial machine, a state (cleaning condition data S1) of environment changes accordingly.

The state observation unit 22 observes the state variable S including the cleaning condition data S1, which has changed after the display or output of the cleaning condition when cleaning the object to be cleaned to the environment by the decision-making unit 52, in the next learning cycle. The learning unit 26 learns the cleaning condition when cleaning the object to be cleaned, for example, by updating the value function Q (that is, the action-value table) using the changed state variable S. The decision-making unit 52 displays the cleaning condition when cleaning the object to be cleaned in accordance with the state variable S under the learned cleaning condition when cleaning the object to be cleaned or outputs the command value C to the industrial machine. By repeating this cycle, the machine learning device 50 continues the learning of the cleaning condition when cleaning the object to be cleaned, and gradually improves the reliability of the cleaning condition when cleaning the object to be cleaned that is determined by itself.

The machine learning device 50 included in the cleaning process optimization device 40 having the above configuration obtains the same effects as those of the machine learning device 20 described above. In particular, the machine learning device 50 can change the state of the environment depending on the output of the decision-making unit 52. On the other hand, in the machine learning device 20, it is possible to obtain a function corresponding to the decision-making unit, configured to reflect the learning result of the learning unit 26 on the environment, from an external device (for example, a control device of an industrial machine).

Figure 7:
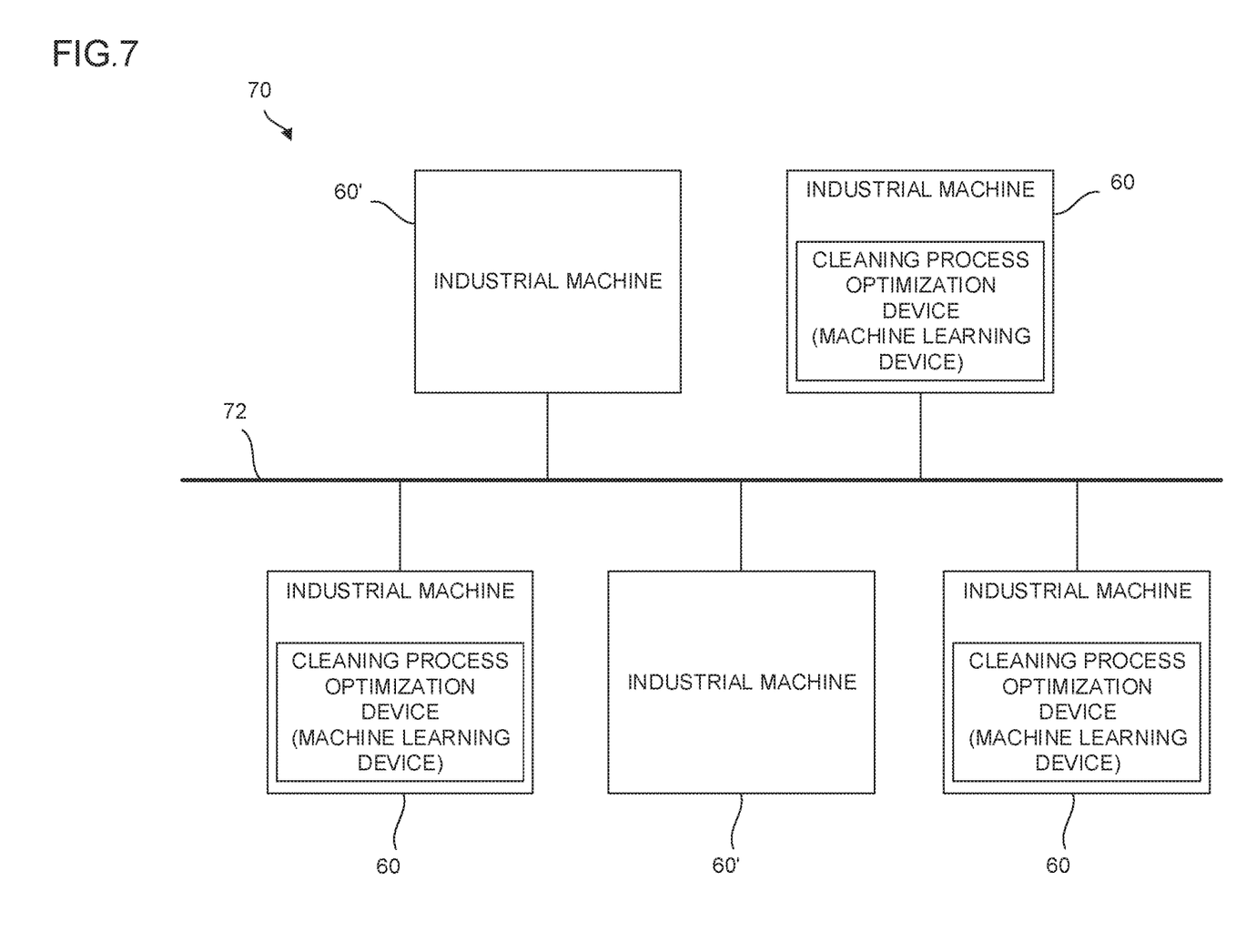
FIG. 7 is a schematic functional block diagram illustrating one aspect of a cleaning system.

FIG. 7 illustrates a cleaning system 70 according to one embodiment that includes an industrial machine 60. The cleaning system 70 includes a plurality of industrial machines 60 and 60' having the same machine configuration and a network 72 connecting these industrial machines 60 and 60' to each other, and at least one of the plurality of industrial machines 60 and 60' is configured as an industrial machine 60 including the above-described cleaning process optimization device 40. The cleaning system 70 can also include an industrial machine 60' that does not include the cleaning process optimization device 40. The industrial machines 60 and 60' have the general configuration required to clean an object to be cleaned.

In the cleaning system 70 having the above-described configuration, the industrial machine 60 including the cleaning process optimization device 40 among the plurality of industrial machines 60 and 60' can automatically and accurately obtain a cleaning condition when cleaning the object to be cleaned in accordance with a contamination state of the object to be cleaned without calculation or rough estimation by using a learning result of the learning unit 26. In addition, the cleaning system 70 can be configured such that the cleaning process optimization device 40 of at least one industrial machine 60 learns the cleaning condition for object to be cleaned, which is common to all the industrial machines 60 and 60', based on the state variable S and the determination data D obtained for each of a plurality of the other industrial machines 60 and 60', and such a learned result is shared among all the industrial machines 60 and 60'. Therefore, it is possible to improve the speed and reliability of the learning of the cleaning condition when cleaning the object to be cleaned using more diverse data sets (including the state variable S and the determination data D) as inputs according to the cleaning system 70.

Figure 8:
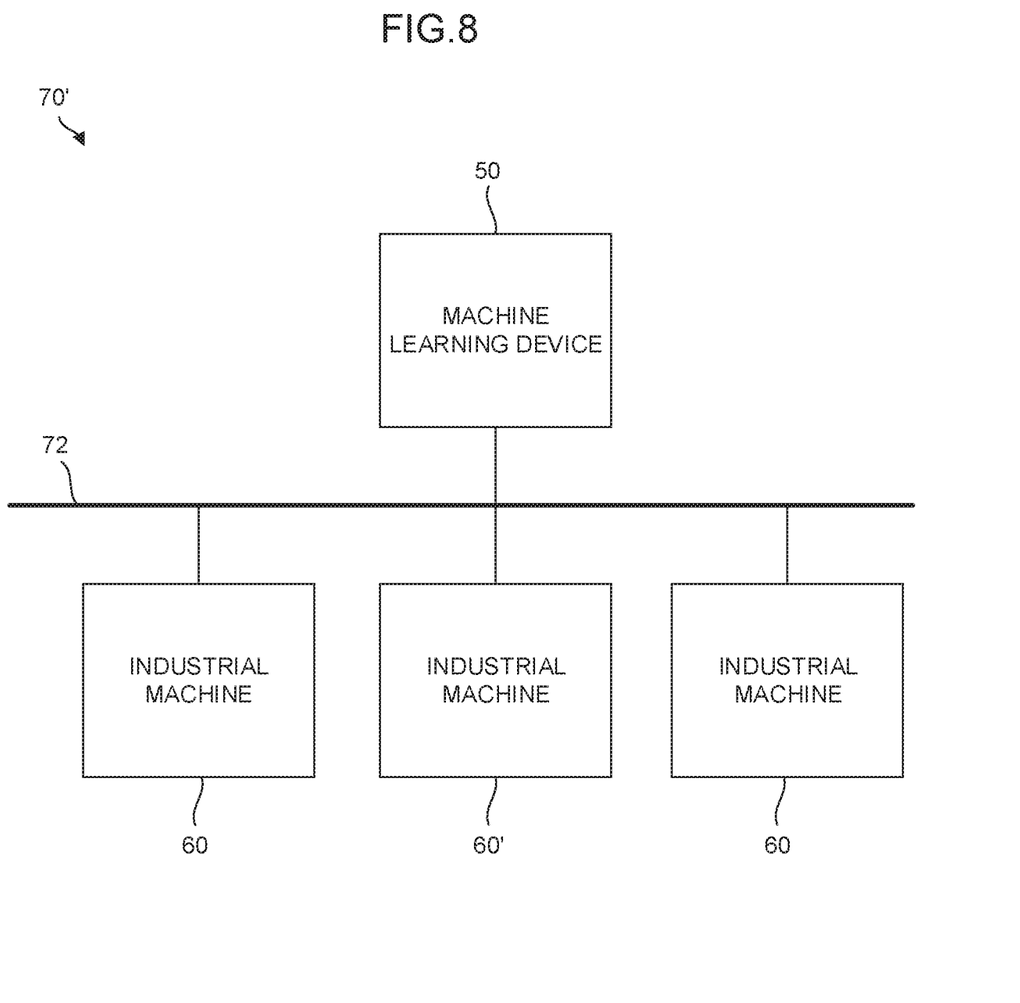
FIG. 8 is a schematic functional block diagram illustrating another aspect of the cleaning system.

FIG. 8 illustrates a cleaning system 70' according to another embodiment that includes an industrial machine 60'. The cleaning system 70' includes a machine learning device 50 (or 20), a plurality of industrial machines 60' having the same machine configuration, and a network 72 connecting these industrial machines 60' and the machine learning device 50 (or 20) to each other.

In the cleaning system 70' having the above-described configuration, the machine learning device 50 (or 20) can learn a cleaning condition when cleaning an object to be cleaned, which is common to all the industrial machines 60', based on the state variable S and the determination data D obtained for each of the plurality of industrial machines 60' and automatically and accurately obtain the cleaning condition when cleaning the object to be cleaned in accordance with a contamination state of the object to be cleaned without calculation or rough estimation by using such a learning result.

The cleaning system 70' can have a configuration in which the machine learning device 50 (or 20) is present in a cloud server prepared in the network 72. According to this configuration, it is possible to connect the required number of industrial machines 60' to the machine learning device 50 (or 20) when necessary regardless of a location at which each of the plurality of industrial machines 60' is present or timing.

A worker engaged in the cleaning system 70 or 70' can execute determination on whether an achievement degree of learning of the cleaning condition when cleaning the object to be cleaned (that is, the reliability of the cleaning condition when cleaning the object to be cleaned) obtained by the machine learning device 50 (or 20) reaches a required level at an appropriate timing after the start of learning by the machine learning device 50 (or 20).

Although the embodiments of the present invention have been described as above, the present invention is not limited only to the above-described embodiments and can be implemented in various aspects by applying suitable modifications.

For example, the learning algorithms executed by the machine learning device 20 or 50, the calculation algorithm executed by the machine learning device 50, a control algorithm executed by the cleaning process optimization device 10 or 40, and the like can adopt various algorithms without being limited to the above-described ones.

Although the embodiments of the present invention have been described as above, the present invention is not limited to the above-described embodiments and can be implemented in various aspects by applying adequate modifications.

The invention claimed is:

1. A cleaning process optimization device for optimizing a cleaning condition for a cleaning device to clean a workpiece machined by a machine tool, the cleaning process optimization device comprising:
   a processor configured to:
      observe, as a state variable representing a current state of environment,
         cleaning condition data indicating the cleaning condition for cleaning the workpiece by the cleaning device, and
         contamination state data indicating a contamination state of the workpiece caused by chips generated in machining the workpiece, the contamination state data measured before cleaning the workpiece, acquire determination data indicating an adequacy determination result on a contamination state of the workpiece after cleaning, and perform machine learning, on the basis of the state variable and the determination data, to learn, in association with the contamination state data, the cleaning condition for cleaning the workpiece by the cleaning device to prevent the chips from scratching a surface of the workpiece during the cleaning.

2. The cleaning process optimization device according to claim 1, wherein the processor is further configured to:
observe type information to identify a type of the workpiece as the state variable, and
learn the cleaning condition for cleaning the workpiece in association with both the contamination state data and the type information.

3. The cleaning process optimization device according to claim 1, wherein the processor is further configured to:
obtain a reward relating to the adequacy determination result, and
update, on the basis of the reward, a function representing a value of the cleaning condition for cleaning the workpiece.

4. The cleaning process optimization device according to claim 1, wherein the processor is further configured to:

calculate an error between (i) a correlation model to derive the cleaning condition for cleaning the workpiece from the state variable and the determination data, and (ii) a correlation feature which is identified from teacher data prepared in advance, and
update the correlation model so as to reduce the error.

5. The cleaning process optimization device according to claim 1, wherein the processor is further configured to calculate the state variable and the determination data in a multilayer structure.

6. The cleaning process optimization device according to claim 1, wherein the processor is further configured to display or output the cleaning condition for cleaning the workpiece based on a learning result obtained from the machine learning.

7. The cleaning process optimization device according to claim 1, wherein the processor is further configured to learn the cleaning condition for cleaning the workpiece in each of a plurality of cleaning devices on the basis of the state variable and the determination data obtained for each of the plurality of cleaning devices.

8. A machine learning device for learning a cleaning condition for a cleaning device to clean a workpiece machined by a machine tool, the machine learning device comprising:

a processor configured to:
observe, as a state variable representing a current state of environment,
cleaning condition data indicating the cleaning condition for cleaning the workpiece by the cleaning device, and
contamination state data indicating a contamination state of the workpiece caused by chips generated in machining the workpiece, the contamination state data measured before cleaning the workpiece,
acquire determination data indicating an adequacy determination result on a contamination state of the workpiece after cleaning, and
perform machine learning, on the basis of the state variable and the determination data, to learn, in association with the contamination state data, the cleaning condition for cleaning the workpiece by the cleaning device to prevent the chips from scratching a surface of the workpiece during the cleaning.

* * * * *